United States Patent Office 3,337,835
Patented Aug. 22, 1967

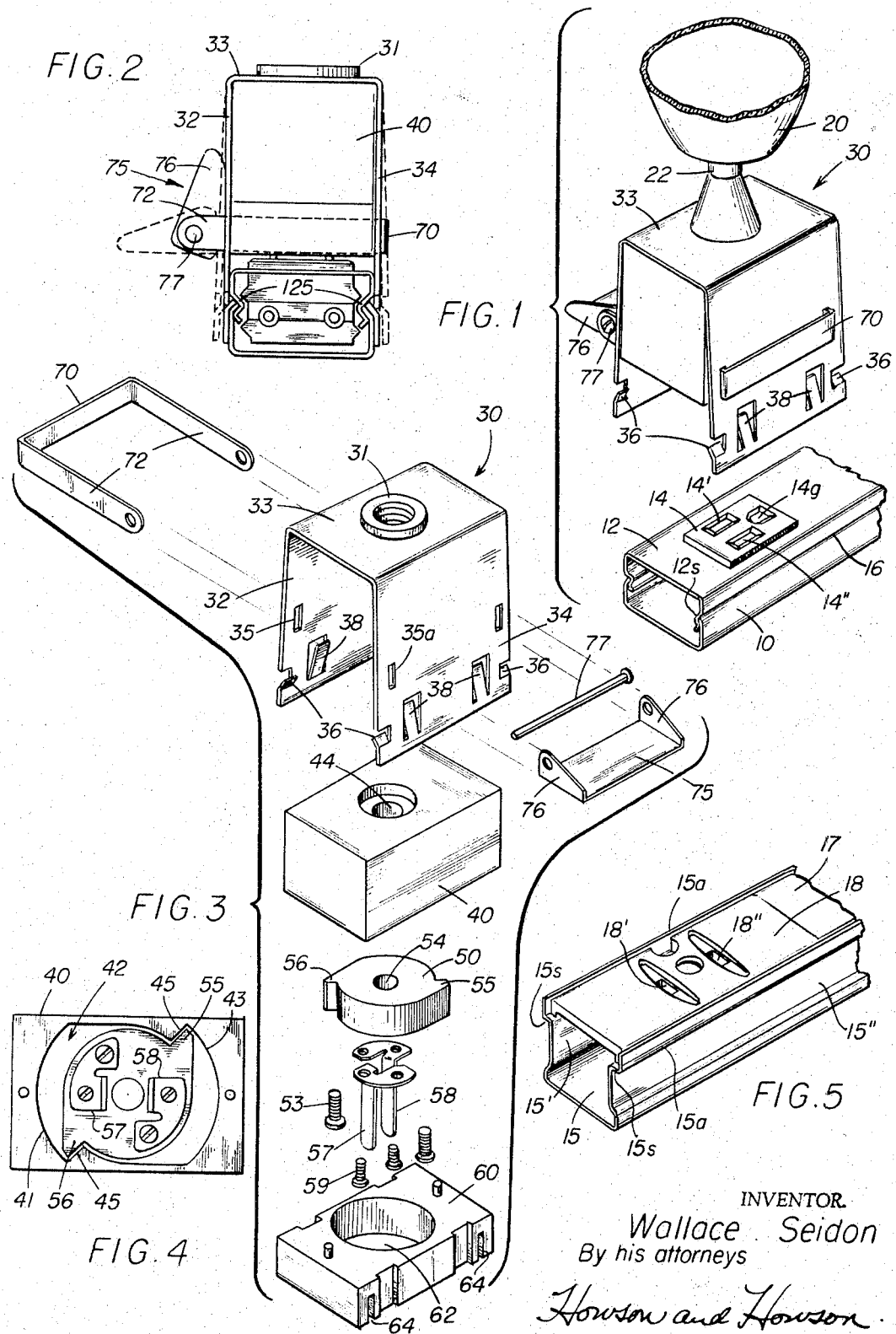

3,337,835
ELECTRIC FITTING
Wallace Seidon, Meriden, Conn., assignor to The Wiremold Company, West Hartford, Conn., a corporation of Connecticut
Filed Feb. 3, 1965, Ser. No. 430,061
6 Claims. (Cl. 339—22)

ABSTRACT OF THE DISCLOSURE

An electric fixture attachable to and removable from different forms of surface-mounted electric wire raceways. Side plates of a U-shaped bracket embrace the sides of the raceway. A locking member passes transversely through the bracket. A manually operable cam member pivotally connected to the locking member can cause the sides of the bracket to grip and lock against the sides of the raceway. The transverse member holds an insulating body in the bracket. Rotatable plug prongs extend from the body for insertion into receptacle slots which may be parallel to or transverse to the raceway.

This abstract shall not be used to interpret the scope of the claims.

---

This invention relates to an electric fixture for use in connection with a surface mounted wiring duct or raceway. More particularly, the invention relates to a fixture which can be mounted at any point along the raceway where there is a receptacle for an attachment plug or provision for attachment plug prongs to connect with the wire conductors within the raceway.

In some raceway installations, electric receptacles for reception of prongs of conventional attachment plugs have the slots for such prongs oriented parallel to the raceway while in other installations, the slots are transverse to the raceway.

When it is desired to make connections to the conductor wires within a raceway by a fixture having prongs for insertion into receptacle slots, it would be necessary to have in hand two types of fixtures differing only in the orientation of their prongs. This would require the purchase by the user of two types of fixtures for the same purpose; and it would require the manufacturer to make and keep stock of two types of fixtures. Thus, there is a need for a fixture with prongs so mounted that they may be used in connection with either type of slot orientation.

It is also desired to provide the fixture with means to secure it to the raceway. Besides the difference in orientation of the receptacle slots, wiring device raceways have different profiles as viewed in cross section.

In order to avoid the need to provide different forms of fixture for use with the different profiles of raceways, there is a need to provide the fixture with securing means which is capable of use with raceways having different profiles.

Thus, one object of this invention is to provide an electric wiring fixture or device which can be used with both parallel and transversely oriented slots of electric receptacles mounted in electric wiring ducts or raceways.

Another object of the invention is to provide means to secure an electric fixture or wiring device to raceways or wiring ducts having different profiles as viewed in cross section.

Another object is to provide an electric fixture which has means to secure it to raceways or wiring ducts having different profiles and which has provision for orienting the contact prongs or fingers so that they may be inserted into differently oriented slots of electric receptacles that are mounted in the raceways, whether the slots are parallel or transverse to the raceway.

Other objects and advantages of the invention will appear as it is described in connection with the accompanying drawing.

In the drawing:
FIG. 1 is a perspective view of the invention as used with one form of raceway and one form of electric receptacle with the fixture removed from the raceway.
FIG. 2 is an end elevation of the form of invention illustrated in FIG. 1, but with the fixture connected with and secured to the raceway.
FIG. 3 is an exploded perspective view of the fixture of FIGS. 1 and 2.
FIG. 4 is a bottom plan view of the insulating base or mounting and the rotatable prong-carrying member which is mounted in the base.
FIG. 5 is a perspective view of another form of raceway and another form of electric receptacle with the prong slots oriented transversely to the raceway.

Referring to the drawing, in FIGS. 1 and 2, the fixture is shown as used with a conventional raceway as is illustrated and described in Patent 2,743,423 of W. E. Parks, having base and cover sections 10 and 12 with an electric wiring receptacle 14 mounted in the cover section. The receptacle has two conventional slots for the reception of conventional attachment plug prongs 14′ and 14″, the slots being oriented parallel to the length of the raceway. A grounding prong aperture 14g is or may also be provided in the receptacle 14. The details of the receptacle structure, including the contacts and connections to electric wires running within the raceway are well known to those skilled in the art and need not be illustrated or described herein.

The raceway has a longitudinal groove 16 in each side where the cover and base sections 10 and 12 join, so that a rounded shoulder exists which is utilized, as is hereinafter described, to cooperate with the fixture in holding it on the raceway.

In FIG. 5, another form of raceway is illustrated in which a channel shaped base portion 15 has parallel side walls 15′, 15″ terminating at their upper edges in outwardly offset lips 15a forming external shoulders 15s nearer the top of the raceway than in FIG. 1. Also in FIG. 5, the shoulders are formed on the base section instead of on the cover section as in FIG. 1.

In FIG. 5, a flat cover section or strip 17 having curved or bent over longitudinal edges may be snapped into place over the base section 15 between the side walls of the base section, being held in place by a slight inward bend or inclination of the lips 15a of the base.

A receptacle 18 made of insulation and of cross sectional profile somewhat similar to the cover section can be snapped into place over the base section and slid along it to a desired location. Slots 18′, 18″ in the receptacle for reception of the prongs of an attachment plug or plug-in fixture are, in this instance, transverse to the raceway.

It is desired at times to plug in an electric fixture at different locations along the raceway where there are receptacles. Such fixtures may be of various types and kinds but, as an example, only an electric lamp is shown.

The fixture in the illustrated example comprises a reflector 20 mounted on a conventional lamp socket 22, such as is readily available on the market. The socket is mounted in turn in conventional fashion on a U-shaped stamped sheet metal bracket (designated generally by numeral 30) by means of an internally threaded nipple or collar 31 centrally located and affixed to the transverse portion 33 of the bracket 30.

Between the side plates 32, 34 of the bracket is located a rectangular block of insulation 40 positioned with its top face against the inner surface of the transverse portion 33 of the bracket. In the opposite or bottom face of the block 40 is formed an elongated recess 42 having arcuate end surfaces 41, 43 adjacent opposite end surfaces of the block. The axis of these arcuate surfaces is the axis of a bore 44 passing through the block coaxially with the bracket nipple 31 for passage of electric wires. The arcuate surfaces terminate in radial surfaces forming shoulders 45, 45 which are diametrically opposite each other.

Seated in the block recess 42 is a turnable disc 50 of insulating material having a central bore 54 coaxial with the axis of bore 44. The disc has diametrically opposite extensions 55, 56 from its periphery, each being formed with a tangential and radial surface. The diameter of the disc measured across the extensions 55, 56 is slightly less than the diameter of the recess 42 measured between the arcuate surfaces 41, 43 while diameter of the remainder of the disc (except for the tangential portion of the extensions) is slightly less than the diameter of arcuate portions of recess 42 measured at the base of shoulders 45, 45. Thus, the disc 50 can be rotated 90° in the recess 42 between the position shown in FIG. 4, wherein the extensions 55, 56 abut the shoulders 45, 45 and a position wherein the tangential portions of the extensions abut complementary portions of the recess 42.

Carried by the disc and secured to the surface thereof which faces outwardly of the recess 42 are conventional attachment plug-prongs or finger contacts 57, 58 which may be secured to the disc by screws 59 or rivets or in any suitable fashion.

Holding the disc turnably in position in recess 42 is a second rectangular block of insulation 60 having a circular hole 62 through it to allow turning of the prongs 57, 58 to and fro. The block 60 may be secured to the block 40 in any suitable fashion and both may be held, in any suitable fashion, in place within the bracket 30, as shown in FIG. 2.

It will, thus, be clear that the prongs project through the block 60 so as to be insertable into the slots 14, 14' of the receptacle 14 in FIG. 1, when the prongs are oriented parallel to the raceway. When it is desired to insert the prongs into a receptacle having slots 18', 18" transverse to the raceway as in FIG. 5, it is only necessary to rotate the prongs and their supporting disc 90° so that the prongs will be transverse to the raceway.

It will be apparent from the foregoing that the blocks 40 and 60 form a two-part insulating support or housing for the turnable member 50.

Although all parts may be secured in the bracket in any suitable fashion, it is preferable that all the parts be held in place by an element of a clamping device by which the described fixture may be held firmly to the raceway in proper position therealong with the prongs 57, 58 inserted in the receptacle slots.

The clamping device comprises a U-shaped clamping member 70 stamped from a strip of sheet metal with parallel arms 72 extending through complementary aligned rectangular apertures such as 35, 35a in the side plates 32, 34 of the bracket. To permit passage of arms 72 through block 60, two parallel narrow deep rectangular grooves 64 are formed in the face of that block 60 which faces the raceway. These grooves snugly fit the arms 72 when the latter are in place so that the arms hold the blocks 60 and 40 in between the bracket arms with the turntable disc 50 between the blocks.

Normally the bracket arms 32, 34 are sprung or diverge outwardly and are not exactly parallel. See dotted line position of FIG. 2. In order to draw the arms together so that they tightly embrace the sides of the raceway, a pivoted camming lever 75 stamped from sheet metal into U-shape as shown in FIG. 3 is pivotally connected to the outwardly extending ends of arms 72 by a pivot pin 77. The pivot is so located in the ends of the arm 72 and the side flanges 76 of the camming lever that in the dotted position of FIG. 2, no compressive force is exerted on the bracket arms 32, 34. But the edges of the flanges 76 adjacent the pivot 77 are enlarged radially so that as the camming lever is moved into the full-line position of FIG. 2, the enlarged edges press on bracket plate 32 toward one side of the raceway while the transverse part of the clamp member 70 draws the other bracket plate toward the other side of the raceway, as shown in full lines in FIG. 2.

In order to grip a raceway of the type shown in FIGS. 1 and 2, short lugs or teeth 36 are punched inwardly at about a 30° angle from the edges of the side plates 32, 34 adjacent each of the four corners thereof, in position to enter the longitudinal grooves in the raceway and engage the shoulders 12s of the cover section 12 when the camming lever is in locking position (full lines of FIG. 2). The side plates possess sufficient resilience and bias to move outwardly an adequate distance when not held in locking position to allow the teeth to clear the shoulders 12s.

In order to grip a raceway of the type shown in FIG. 5, a set of two long lugs or teeth 38 are provided in each side plate of the bracket 30. They are so located and inwardly bent as to engage under the shoulders 15s of the channel section 15 of the raceway when the camming lever is in locking position. When not held in locking position, the side plates move outwardly, as before, a sufficient distance to allow teeth 38 to clear the shoulders 15s.

From the foregoing, it will be clear that the invention provides a fixture that can be connected to a raceway receptacle or outlet having either transversely or longitudinally oriented slots by merely turning the plug prongs of the fixture to orient them in conformity with the slots. At the same time, the invention provides for securing the fixture to the raceway, without the need for tools or semi-permanent attaching means such as screws, and for quickly detaching the fixture from its position of securement. Additionally, the invention provides for use of elements of the securing means to perform the dual function of holding the parts of the fixture together. The invention also provides ease of wiring the fixture, i.e. connecting the plug-prongs to the wires which connect with the electric socket.

Many modifications within the scope of the invention will appear to those skilled in the art. Therefore, the invention is not limited to the embodiments as specifically shown and described.

What is claimed is:

1. An electric fitting for use in combination with surface-mounted closed raceways containing electric conductor wires and having electric receptacles positioned therealong which have at least one pair of slots for the reception of attachment plug prongs, the raceways having a channel-shaped base part with a cover thereon, said base part having parallel side walls each having a groove running longitudinally along it, said electrical fitting comprising a U-shaped bracket having side portions adapted to embrace the side walls of the raceway, means on the side portions of said bracket engageable with the grooves in the side walls of the raceway, clamping means including a member extending transversely of said U-shaped member and including a manually operable member movable to a locking position to cause said groove-engaging means to move simultaneously toward the side walls of the raceway for engagement in said grooves to lock said fittting to the raceway, and an insulating body mounted in said bracket having attachment plug prongs extending toward the raceway for engagement with a raceway-supported receptacle.

2. An electric fitting as claimed in claim 1 wherein said manually operable member is pivotally mounted on said transverse member, and cam means on said manually operable member engaging the side of said bracket as said manually operable member is moved into locking position.

3. An electric fitting as claimed in claim 2 wherein the transverse clamping member is U-shaped and said cam means engages said bracket at two spaced points lengthwise of the raceway.

4. An electric fitting for use in combination with surface-mounted closed raceways containing electric conductor wires and having electric receptacles positioned therealong which have at least one pair of slots for the reception of attachment plug prongs, oriented either parallel to or transverse to the raceway, the raceway having a channel-shaped base part with a cover part thereon, said base part having side walls each having a groove running longitudinally along it, said electrical fitting comprising a U-shaped bracket having side portions adapted to embrace the side walls of the raceway, means on the side portions of said bracket engageable with the grooves in the side walls of the raceway, clamping means including a member extending transversely of said U-shaped member and including a manually operable member movable to a locking position to cause said groove-engaging means to move simultaneously toward the side walls of the raceway for engagement in said grooves to lock said fitting to the raceway, and an insulating supporting means, an insulating member supported by and turnable with respect to said insulating-supporting means, plug prongs mounted on said turntable member adapted to be oriented for insertion into receptacle slots either parallel to or transverse to the raceway by turning of said member.

5. An electric fitting as claimed in claim 1 wherein said clamping means engages said insulating body and maintains it in mounted position on the bracket.

6. An electric fitting as claimed in claim 4 wherein said clamping means engages said insulating supporting means and maintains it in mounted position on the bracket.

References Cited

UNITED STATES PATENTS

| | | | |
|---|---|---|---|
| 2,561,031 | 7/1951 | Murphy | 339—22 |
| 2,743,423 | 4/1956 | Parks | 339—21 |
| 3,015,795 | 1/1962 | Meacham | 339—22 X |
| 3,239,795 | 3/1966 | Verrone | 339—91 |

FOREIGN PATENTS

| | | |
|---|---|---|
| 240,724 | 12/1960 | Australia. |
| 1,382,041 | 11/1964 | France. |
| 1,013,326 | 12/1965 | Great Britain. |

MARVIN A. CHAMPION, *Primary Examiner.*

PATRICK A. CLIFFORD, *Examiner.*